United States Patent [19]

Breneman et al.

[11] Patent Number: 4,743,344

[45] Date of Patent: May 10, 1988

[54] TREATMENT OF WASTES FROM HIGH PURITY SILICON PROCESS

[75] Inventors: William C. Breneman, Vancouver, Wash.; Chi-Cheng Yang, Beaverton, Oreg.; Gunnar Henningsen, Birmingham, Ala.

[73] Assignee: Union Carbide Corporation, Danbury, Conn.

[21] Appl. No.: 844,361

[22] Filed: Mar. 26, 1986

[51] Int. Cl.$^4$ .............................................. B01D 3/00
[52] U.S. Cl. ................................. 203/81; 159/47.3; 423/341; 423/342
[58] Field of Search ................. 203/71, 81; 159/47.1, 159/47.3; 423/341, 342; 55/72

[56] References Cited

U.S. PATENT DOCUMENTS 3,878,291  4/1975  Keller et al. ...................... 423/341
4,092,446  5/1978  Padovani et al. .................. 423/342
4,130,632  12/1978  Braunsperger et al. ........... 423/342
4,340,574  7/1982  Coleman ............................ 423/342

FOREIGN PATENT DOCUMENTS 2161641  10/1973  Fed. Rep. of Germany ...... 423/342
1263972  2/1972  United Kingdom ............... 423/342
2028289  3/1980  United Kingdom ............... 423/342
0327782  10/1977  U.S.S.R. ............................ 423/341

Primary Examiner—S. Leon Bashore
Assistant Examiner—V. Manoharan
Attorney, Agent, or Firm—Morris N. Reinisch

[57] ABSTRACT

Method for treating waste slurries containing solid impurities, e.g. in the form of metal chlorides, and silicon tetrachloride and trichlorosilane by evaporation and separation techniques to recover more of the silicon tetrachloride and trichlorosilane.

1 Claim, 1 Drawing Sheet

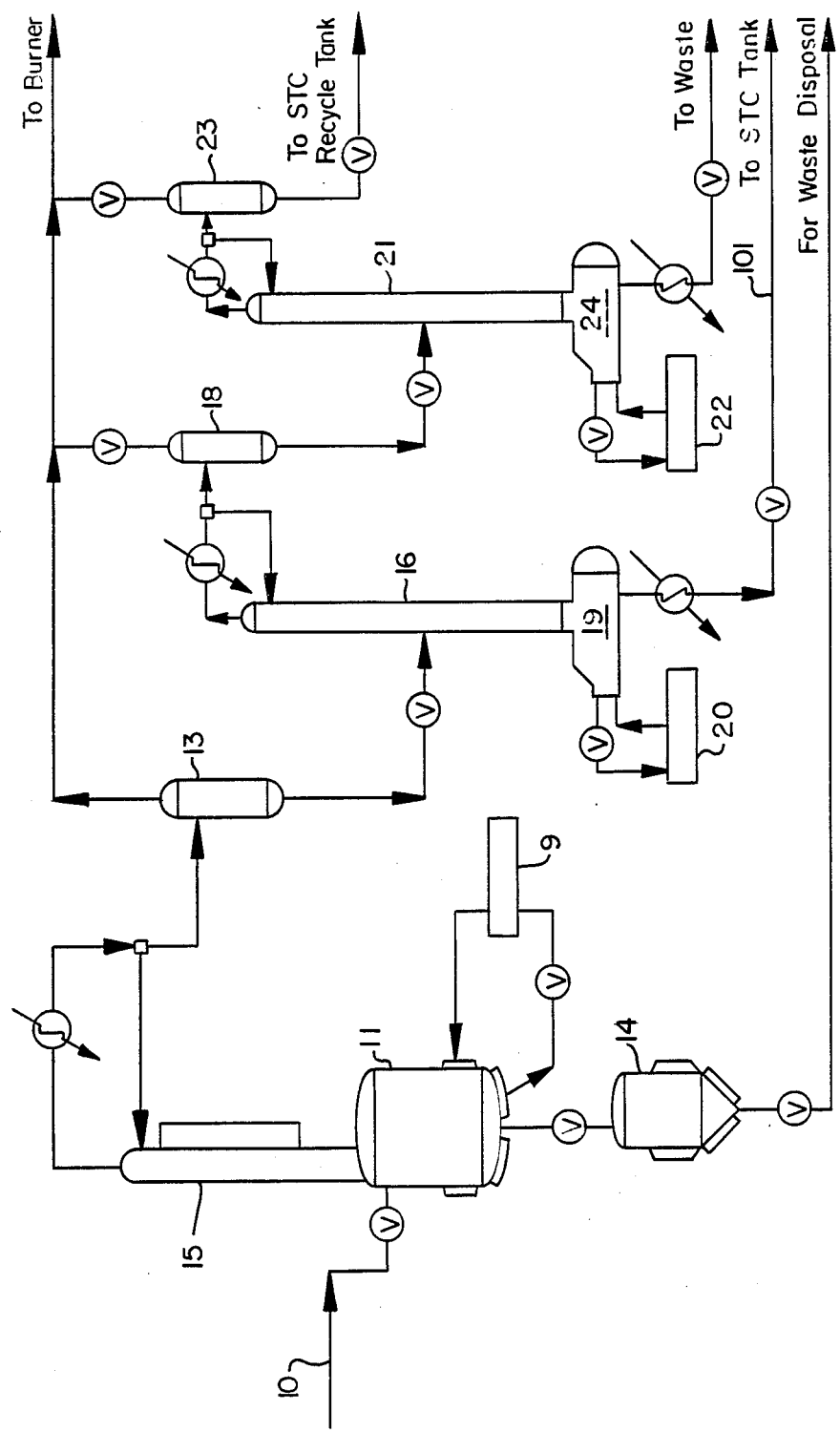

TREATMENT OF WASTES FROM HIGH PURITY SILICON PROCESS

INTRODUCTION

The present invention is directed to the treatment of waste materials which accumulate in the course of the manufacture of high purity silicon. More particularly, the present invention is directed to the treatment of waste materials which accumulate in the course of a process for the manufacture of high purity silicon which starts with the hydrogenation of metallurgical grade silicon to produce high purity silane, which silane is decomposed to obtain high purity silicon, and hydrogen for re-cycle to the hydrogenation section.

BACKGROUND OF THE INVENTION

A known process for ultrahigh purity silicon production, as recited in U.S. Pat. No. 4,342,749 (incorporated herein by reference), involves the upgrading of metallurgical grade silicon feedstock to an ultrahigh purity silicon powder product. The process for providing ultrahigh purity silicon involves three components, i.e., a hydrogenation subsection, a redistribution reactor and column subsection, and a silane pyrolysis and silicon powder consolidation subsection. The hydrogenation subsection involves the reaction of the metallurgical grade silicon feedstock (silicon with approximately 2% by weight of impurities such as Fe, Al, Ti) with silicon tetrachloride and hydrogen to produce an intermediate chlorosilane, e.g. trichlorosilane product; during such procedure, waste materials including many of the metallurgical impurities in the silicon feedstock are removed from the process in a chlorosilane waste stream. The trichlorosilane intermediate product passes as feedstock to the reactor and column section wherein a combination of reactors containing resin catalyst and distillation columns are utilized to upgrade the chlorosilane intermediate product to an ultrahigh purity silane product, and a recycle silicon tetrachloride stream which is utilized in the above-mentioned hydrogenation subsection. The final subsection of the process utilizes the ultrahigh purity silane obtained in the previous subsection to produce ultrahigh purity silicon product material; e.g., the ultrahigh purity silane material can be pyrolyzed utilizing homogeneous decomposition reaction of the silane in a free space type of reactor such as disclosed in U.S. Pat. No. 4,348,749. Additional wastes are accumulated in the operation intermediate and final subsection and withdrawn from the process.

SUMMARY OF THE INVENTION

The above noted wastes which accumulate routinely in the course of the manufacture of high purity silicon from metallurgical grade silicon are eventually collected as a slurry which includes very fine particles of silicon, iron, and aluminum chlorides of aluminum, iron and titanium, and trace amounts of other high boiling chlorinated impurities in the amounts of about from 2 to 20% by weight in the aggregate; with the balance being trichlorosilane (TCS) and silicon tetrachloride (STC). This range of composition can be readily processed by the present invention. Collected slurry of the type noted above has been previously considered to be a total waste material to be disposed of as such. However, since this waste material contains a substantial amount of TCS and STC, it would be of significant economic advantage to recover as much of the TCS and STC as possible, with the advantage of decreasing the volume of waste to be disposed of, while providing valuable material for re-use in the high purity silicon manufacturing process.

The process of the present invention for recovery of TCS and STC from wastes from silane manufacture utilizes an evaporator, i.e. a reboiler, with associated heating and circulating equipment, and the process has the flexibility to efficiently separate, on a continuous basis, the desirable chlorosilanes, STC and TCS, from entrained metal particles, metal chlorides, and low, intermediate, and high boiling impurities by evaporation and distillation. In the course of the process, light vapors are routed to gas burners, while "heavies", including metal chlorides and metal particles remain as residue in the reboiler can be readily removed therefrom and directly neutralized or combusted with a suitable hydrocarbon such as kerosene. Silicon tetrachloride (STC) and trichlorosilane (TCS) from the treated slurry are routinely recovered to the extent of up to 67% and more by weight of the "waste", and can be recycled directly back to the process system.

BRIEF DESCRIPTION OF THE DRAWING

With reference to the drawing, the accumulated waste slurry described above, of metal particles, metal chlorides, STC and TCS, is introduced at 10 to the reboiler 11, which is associated with refluxed separation column 15, and reboiler 11 is provided with heating means 9 for the evaporation of volatile slurry constituents from the reboiler 11 to column 15. Two other refluxed separation columns, 16 and 21 are provided, with associated heating means 20, 22 and associated reboilers 19 and 24 as shown in the drawing. The metal chloride removal column section of the process, which includes reboiler 11 and separator column 15, is arranged to concentrate the "heavies" in the slurry in reboiler 11 i.e. the high boiling metal chlorides and the unreacted silicon particles, and other metal particles. STC, TCS and the "lighters" than STC and TCS, and "intermediates" boiling between TCS and STC are evaporated, condensed and then fed to the downstream STC recovery column 16 by way of overhead receiving vessel 13. Those impurities which are lighter than dichlorosilane, are routinely vented as vapor to a flare header for burning. The "heavies", i.e. heavier than STC (metal chlorides, entrained metal solids and trace amounts of high boiling chlorinated impurities) are retained in reboiler 11 and periodically purged out of the reboiler 11 to a portable receiver 14 located underneath reboiler 11. The liquid level in the reboiler 11 will drop as heating proceeds and the boiling temperature is slowly increased, as a result the solids concentration in the reboiler 11 increases. The column 15 is operated at a reflux ratio sufficient to ensure separation of overhead from materials having a higher boiling point than STC, e.g. suitably a reflux ratio above 2, preferably about 3 to 5. About 25 theoretical stages of packing are suitably provided in column 15 with additional five disc-donut trays in the lower section of the column 15 being suitably provided to minimize solids entrainment. The concentrated metal chloride residue recovered from reboiler 11 are neutralized or combusted with a suitable hydrocarbon such as kerosene after being purged to the portable receiver 14.

The contents of metal chloride column overhead receiver vessel 13, silicon tetrachloride (STC) and lighters, are fed to the STC recovery column 16 where STC is separated as column bottoms and recovered for direct re-use at 101. Intermediate boiling impurities, trichlorosilane (TCS), and lighters are condensed and held in the overhead receiver 18, and then fed to TCS recovery column 21 for further separation. Column 16 is designed in a particular embodiment to be operated at the relatively low pressure of 110 psia. However, it can be operated at lower pressure e.g. 10–20 psia. Column 16 is suitably filled with a packing equivalent to 50 separation stages and is preferably designed to be operated continuously.

TCS, and medium boiling impurities intermediate TCS and STC and fed from overhead receiver 18 to the TCS separation column 21 where TCS is separated and recovered as overhead in receiver vessel 23. From the column overhead receiver 23, TCS is recovered for direct re-use at 102. The intermediate boiling impurities (column 21 bottoms), are discharged from 24 through a cooler 25 and drummed for direct waste disposal. In a preferred embodiment TCS recovery system is operated continuously with column 21 designed to be equivalent to the STC recovery column 16, but operated at a lower pressure e.g., 10–20 psi lower than the STC recovery column 16. Particular advantages of the process of the present invention are as follows: the process of the invention is relatively inexpensive from both capital cost and operating expense point of view; the process is a straight forward way to recover relatively expensive materials which would otherwise be disposed of as a waste, such disposal being expensive; the process is flexible in being able to efficiently and continuously process a wide range of impurities, from low boiling to high boiling; the amount of waste that needs to be incinerated or burned is a small proportion and can be consistently removed as a concentrated slurry.

The following example will further illustrate the present invention.

EXAMPLE

Using equipment of the type shown in the drawing waste slurry, at the rate of 974 pounds per hour accumulated in the reboiler associated with the first separation column; the waste slurry, on an hourly average basis, contained 763 pounds of STC, 178 pounds of TCS and 33 pounds of solid impurities (5 pounds of Si, 18 pounds of $FeCl_3$, 10 pounds of $AlCl_3$). The impurities were 3.4% by weight of the slurry. STC and TCS were continuously evaporated from the reboiler into the first separation column and a concentrated slurry was developed in the reboiler which comprised, on an hourly average basic, a total of 140 pounds of STC and TCS with 33 pounds of solid impurities plus trace impurities; this material was disposed of as waste. The following materials were recovered, on an hourly average basis, from the second and third separation columns:
  640 pounds of STC
  165 pounds of TCS Thus the overall recovery of STC and TCS was about 85%; waste as noted before; was only a total of 173 pounds (33 pounds of solids and 140 pounds STC & TCS).

What is claimed is:

1. A method for the treatment of a waste slurry which includes silicon, iron and aluminum metal particles, chlorides of iron and aluminum, silicon tetrachloride (STC) and trichlorosilane (TCS), materials having boiling points which are intermediate STC and TCS, and materials having boiling points which are lower than STC and TCS, with said STC and TCS being, in the aggregate, the predominant constituents of the slurry, comprising:
  (a) feeding the said waste slurry to a first separation column, to provide STC, TCS, materials boiling lower than STC and TCS, and materials boiling intermediate STC and TCS as overhead from said frist separation column, and to provide silicon, iron, aluminum metal particles and chlorides of iron and aluminum as bottoms in said first separation column which is passed to a waste storage vessel;
  (b) condensing the overhead from the first separation column and passing this condensed overhead to a second separation column in which (i) STC is recovered as bottoms and (ii) materials boiling lower than STC, including TCS and materials boiling intermediate STC and TCS are recovered as overhead;
  (c) condensing the overhead from the second separation column and passing this condensed overhead to a third separation column in which (i) TCS is recovered as overhead and (ii) materials boiling intermediate STC and TCS are recovered as a bottoms waste stream.

* * * * *